United States Patent
Kim et al.

(10) Patent No.: US 12,236,541 B2
(45) Date of Patent: Feb. 25, 2025

(54) GEOMETRY-AWARE AUGMENTED REALITY EFFECTS WITH REAL-TIME DEPTH MAP

(71) Applicant: GOOGLE LLC, Mountain View, CA (US)

(72) Inventors: David Kim, Zug (CH); Ruofei Du, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 47 days.

(21) Appl. No.: 17/998,736

(22) PCT Filed: May 29, 2020

(86) PCT No.: PCT/US2020/070094
§ 371 (c)(1),
(2) Date: Nov. 14, 2022

(87) PCT Pub. No.: WO2021/242327
PCT Pub. Date: Dec. 2, 2021

(65) Prior Publication Data
US 2023/0206567 A1     Jun. 29, 2023

(51) Int. Cl.
*G06T 19/00*     (2011.01)
*G06T 7/50*     (2017.01)
(Continued)

(52) U.S. Cl.
CPC ............. *G06T 19/006* (2013.01); *G06T 7/50* (2017.01); *G06T 15/06* (2013.01); *G06T 15/60* (2013.01);
(Continued)

(58) Field of Classification Search
None
See application file for complete search history.

(56) References Cited

U.S. PATENT DOCUMENTS

| 8,411,080 B1 | 4/2013 | Zimmermann |
| 8,666,712 B2 | 3/2014 | Bleiweiss et al. |

(Continued)

FOREIGN PATENT DOCUMENTS

| CN | 110809750 A | 2/2020 |
| JP | H11088913 A | 3/1999 |

(Continued)

OTHER PUBLICATIONS

International Search Report and Written Opinion for PCT Application No. PCT/US2020/070094, mailed on Nov. 6, 2020, 10 pages.

(Continued)

*Primary Examiner* — Frank S Chen
(74) *Attorney, Agent, or Firm* — Brake Hughes Bellermann LLP

(57) ABSTRACT

Techniques of introducing virtual objects into a physical environment of AR system include displacing vertices of a mesh representing the physical environment based on a live depth map. For example, an AR system generates a mesh template, i.e., an initial mesh with vertices that represents a physical environment and a depth map that indicates a geometry of real objects within the physical environment. The AR system is configured to represent the real objects in the physical environment by displacing the vertices of the mesh based on depth values of the depth map and parameter values of a pinhole camera model. The depth values may be taken from the perspective of an illumination source in the physical environment.

20 Claims, 14 Drawing Sheets

(51) Int. Cl.
*G06T 15/06* (2011.01)
*G06T 15/60* (2006.01)
*G06T 17/20* (2006.01)

(52) U.S. Cl.
CPC .......... *G06T 17/20* (2013.01); *G06T 2200/28* (2013.01); *G06T 2207/10028* (2013.01); *G06T 2210/21* (2013.01); *G06T 2215/12* (2013.01); *G06T 2215/16* (2013.01)

(56) References Cited

U.S. PATENT DOCUMENTS

| | | | |
|---|---|---|---|
| 10,430,999 | B2 | 10/2019 | Detemmerman et al. |
| 10,699,491 | B2 | 6/2020 | Pahud et al. |
| 10,701,247 | B1* | 6/2020 | Hossain ................... G06T 7/55 |
| 11,262,838 | B2 | 3/2022 | Fujinawa et al. |
| 2007/0024620 | A1 | 2/2007 | Muller-Fischer et al. |
| 2010/0182315 | A1 | 7/2010 | Asami |
| 2013/0321416 | A1* | 12/2013 | Marvie ................. G06T 15/405 |
| | | | 345/420 |
| 2014/0140579 | A1 | 5/2014 | Takemoto |
| 2016/0086385 | A1* | 3/2016 | Gourlay .................. G06T 19/20 |
| | | | 382/154 |
| 2016/0148433 | A1* | 5/2016 | Petrovskaya .......... G02B 27/01 |
| | | | 345/633 |
| 2018/0225805 | A1* | 8/2018 | Brandt ................... H04N 23/45 |
| 2019/0057545 | A1 | 2/2019 | Varekamp et al. |
| 2019/0197786 | A1 | 6/2019 | Molyneaux et al. |
| 2019/0371060 | A1* | 12/2019 | Energin ................. G06T 19/003 |
| 2020/0158529 | A1 | 5/2020 | Zhang et al. |
| 2021/0019953 | A1* | 1/2021 | Pekelny .................... G06T 7/32 |
| 2021/0225074 | A1* | 7/2021 | Meilland ................. G06T 17/20 |
| 2021/0244376 | A1* | 8/2021 | Buelow .................. A61B 6/544 |
| 2022/0076051 | A1* | 3/2022 | Donahue ............... G06T 19/006 |

FOREIGN PATENT DOCUMENTS

| | | |
|---|---|---|
| JP | 2009086856 A | 4/2009 |
| JP | 2009545067 A | 12/2009 |
| JP | 2011039646 A | 2/2011 |
| JP | 2012064095 A | 3/2012 |
| JP | 2014106543 A | 6/2014 |
| KR | 20150107063 A | 9/2015 |
| KR | 20160068691 A | 6/2016 |
| KR | 20180058762 B | 6/2018 |
| WO | 2018209969 A1 | 11/2018 |
| WO | 2019150781 A1 | 8/2019 |

OTHER PUBLICATIONS

Okamoto, et al., "3D Human Body Display by Using Depth Information for Remote Shared Mixed Reality", IEICE Technical Report MVE2009-43(Oct. 2009), Oct. 1, 2009, vol. 109, No. 215, pp. 53-58. (English Abstract).

Kim, et al., "Mesh-Based Depth Coding for 3D Video Using Hierarchical Decomposition of Depth Maps", Image Processing, Sep. 30, 2007, 4 pages.

* cited by examiner

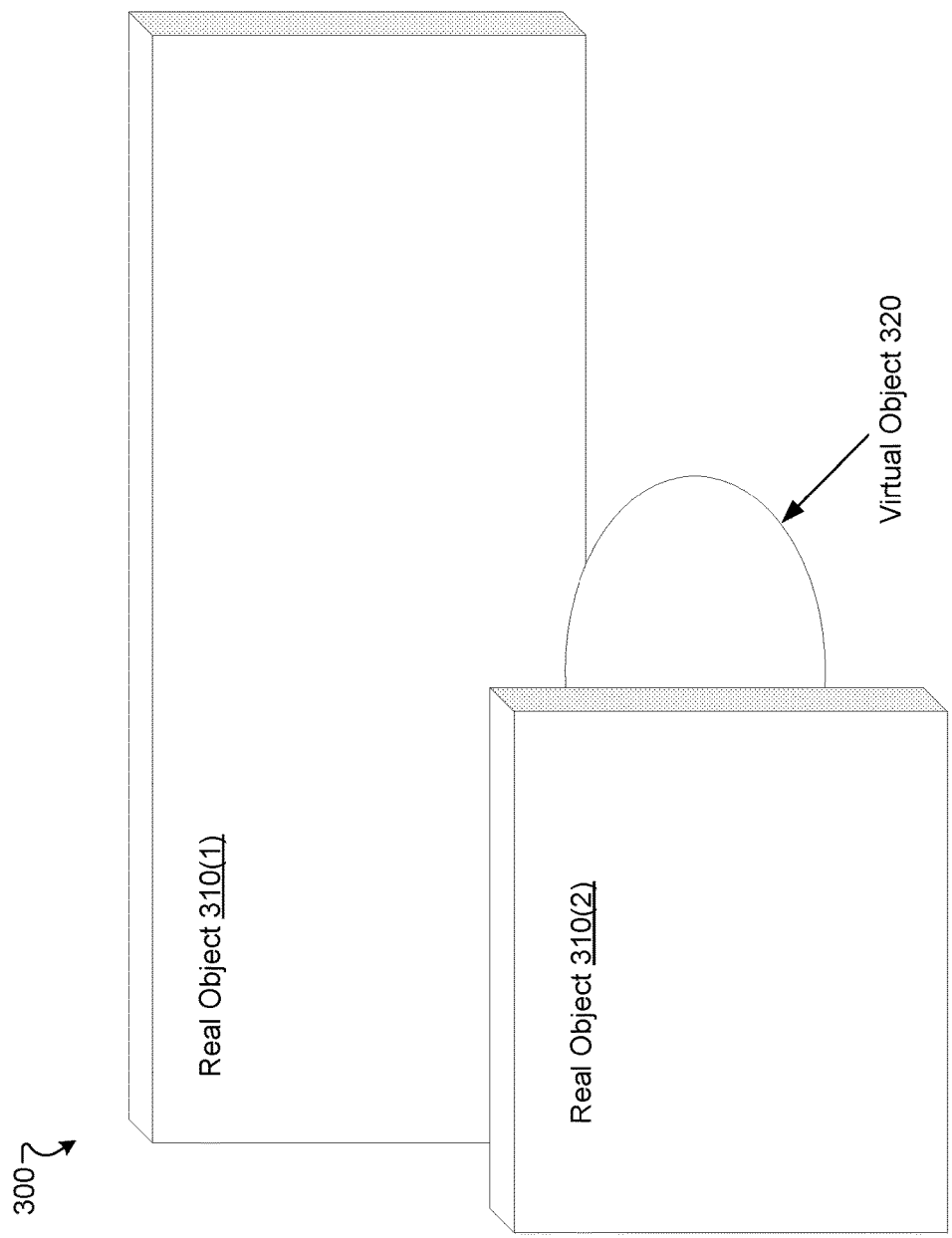

GEOMETRY-AWARE AUGMENTED REALITY EFFECTS WITH REAL-TIME DEPTH MAP

CROSS REFERENCE TO RELATED APPLICATION

This application is a 35 U.S.C. § 371 National Phase Entry Application from PCT/US2020/070094 filed May 29, 2020, designating the U.S., the disclosure of which is incorporated herein by reference in its entirety.

TECHNICAL FIELD

This description relates to operating an augmented reality system in which virtual objects interact with real objects in a physical environment.

BACKGROUND

Augmented reality (AR) is an interactive experience of a physical environment (i.e., a scene with real objects) where objects that reside in the physical environment are enhanced by computer-generated perceptual information, including visual information. Some AR systems include features such as a combination of real and virtual worlds, real-time interaction, and accurate 3D registration of virtual and real objects.

SUMMARY

Implementations provide a geometry-aware AR system that generates a mesh template, i.e., an initial mesh with vertices that represents a physical environment and a depth map that indicates a geometry of real objects within the physical environment. A connectivity of the mesh is determined from generated indices representing the vertices as arranged in triplets in a specified winding order to produce a set of triangles that make up the mesh. The AR system is configured to represent the real objects in the physical environment by displacing the vertices of the mesh based on depth values of the depth map and parameter values of a pinhole camera model. The depth values may be taken from the perspective of an illumination source in the physical environment. The mesh template and depth map may be generated in a central processing unit (CPU) of the AR system and copied to a graphics processing unit (GPU) on which an AR engine may perform shadow mapping and physics simulations efficiently. The depth map may be generated in real time and updated within the GPU. The shadow mapping and physics simulations also depend on the connectivity of the mesh, which does not change over time.

In one general aspect, a method can include generating a triangular mesh representing a physical environment and a depth map of the physical environment, the triangular mesh including a plurality of vertices, the depth map including a plurality of depth values. The method can also include performing a displacement operation on the plurality of vertices of the triangular mesh to produce a plurality of displaced vertices representing a geometry of at least one real object within the physical environment, the displacement operation being based on the depth map. The method can further include receiving virtual object data representing a virtual object configured to be displayed with the at least one real object in the physical environment. The method can further include displaying the virtual object in the physical environment on a display to produce a displayed virtual object, the displayed virtual object having a difference from the virtual object according to the plurality of displaced vertices.

In another general aspect, a computer program product comprises a non-transitory storage medium, the computer program product including code that, when executed by processing circuitry of a computing device, causes the processing circuitry to perform a method. The method can include generating a triangular mesh representing a physical environment and a depth map of the physical environment, the triangular mesh including a plurality of vertices, the depth map including a plurality of depth values. The method can also include performing a displacement operation on the plurality of vertices of the triangular mesh to produce a plurality of displaced vertices representing a geometry of at least one real object within the physical environment, the displacement operation being based on the depth map. The method can further include receiving virtual object data representing a virtual object configured to be displayed with the at least one real object in the physical environment. The method can further include displaying the virtual object in the physical environment on a display to produce a displayed virtual object, the displayed virtual object having a difference from the virtual object according to the plurality of displaced vertices.

In another general aspect, an electronic apparatus configured to generate a recrawling policy comprises memory and controlling circuitry coupled to the memory. The controlling circuitry can be configured to generate a triangular mesh representing a physical environment and a depth map of the physical environment, the triangular mesh including a plurality of vertices, the depth map including a plurality of depth values. The controlling circuitry can also be configured to perform a displacement operation on the plurality of vertices of the triangular mesh to produce a plurality of displaced vertices representing a geometry of at least one real object within the physical environment, the displacement operation being based on the depth map. The controlling circuitry can also be configured to receive virtual object data representing a virtual object configured to be displayed with the at least one real object in the physical environment. The controlling circuitry can also be configured to display the virtual object in the physical environment on a display to produce a displayed virtual object, the displayed virtual object having a difference from the virtual object according to the plurality of displaced vertices.

The details of one or more implementations are set forth in the accompanying drawings and the description below. Other features will be apparent from the description and drawings, and from the claims.

BRIEF DESCRIPTION OF THE DRAWINGS

FIGS. 3B and 3C are diagrams illustrating a front view of an example physical environment imaged in an augmented reality system.

DETAILED DESCRIPTION

Figure 1A:
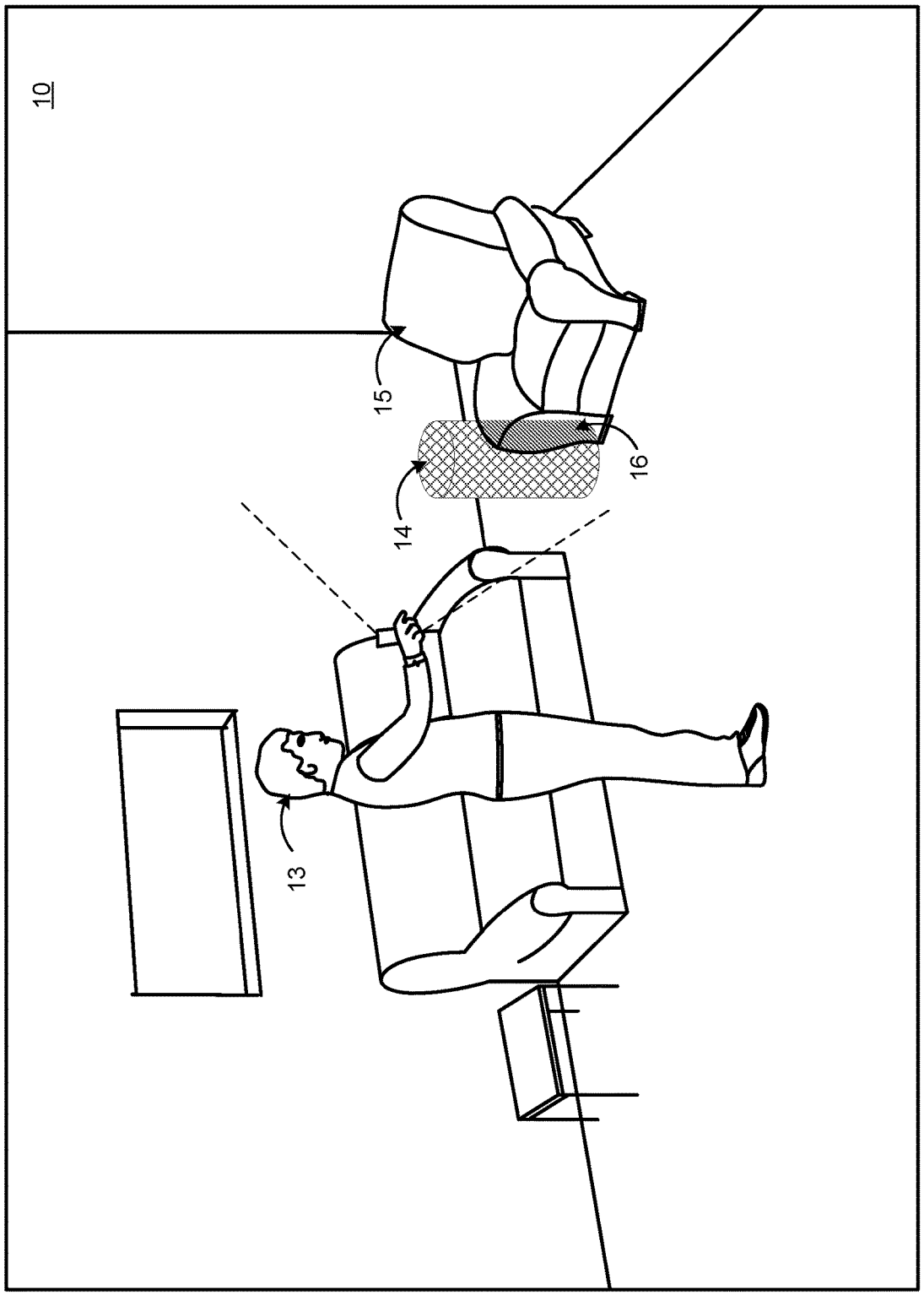
FIG. 1A is a diagram illustrating an example real-world space.

In some cases, an AR system introduces a virtual object within a display screen that is associated with a location in a physical environment in such a way that the virtual object is occluded by a real object in that environment. Nevertheless, some AR systems do not account for geometry of real objects in the physical environment, resulting in virtual objects not being occluded by real objects. For example, virtual furniture and game characters may appear in front of real objects even when they are spatially placed behind a couch or a table. Shadows and virtual rigid body colliders may interact only with known AR objects, such as detected horizontal or vertical planes.

Conventional approaches to introducing virtual objects into a physical environment in an AR system include performing a scan of the physical environment to produce a coarse three-dimensional model of the physical environment. Moreover, the conventional approaches include creating shadows by computing a shadow map based on planes detected from a camera stream.

A technical problem with the above-described conventional approaches to introducing virtual objects into a physical environment in an AR system is that such approaches require too many computational resources to be performed in real time. In this way, such conventional approaches may degrade the real-time interaction experience for the user. Further, shadows resulting from the conventional approaches may result in visible artifacts when the virtual object casts shadow onto other physical objects on the plane.

In accordance with the implementations described herein, a technical solution to the above-described technical problem includes displacing vertices of a mesh representing the physical environment based on a live depth map. For example, an AR system generates a mesh template, i.e., an initial mesh with vertices that represents a physical environment and a depth map that indicates a geometry of real objects within the physical environment. A connectivity of the mesh is determined from generated indices representing the vertices as arranged in triplets in a specified winding order to produce a set of triangles that make up the mesh. The AR system is configured to represent the real objects in the physical environment by displacing the vertices of the mesh based on depth values of the depth map and parameter values of a pinhole camera model. The depth values may be taken from the perspective of an illumination source in the physical environment. The mesh template and depth map may be generated in a central processing unit (CPU) of the AR system and copied to a graphics processing unit (GPU) on which an AR engine may perform shadow mapping and physics simulations efficiently. The depth map may be generated in real time and updated within the GPU. The shadow mapping and physics simulations also depend on the connectivity of the mesh, which does not change over time.

A technical advantage of disclosed implementations is that the above-described AR system provides occlusions in real time. The compute time is greatly improved by not requiring mapping the scene with a surface reconstruction algorithm making this approach readily available on mobile devices. The representation of depth as screen-space mesh also enables a myriad of existing 3D assets and shader effects to interact with the real environment in AR. Moreover, because the mesh template and real-time depth maps are operated on by a GPU having built-in shader and physics simulation capabilities, the computations are inherently speedy; for example, vertex displacements may be performed in parallel.

FIG. 1A illustrates a real-world space 10 and illustrates a user 13 in the real-world space 10. Real-world objects and AR objects are illustrated in this figure together as they would be seen by the user 13 via a mobile device. A scene (e.g., of a room) viewed by a user 13 of an AR system is illustrated with the dashed lines. The real-world space 10 can include at least one real-world object 15. The AR system associated with the mobile device can be configured to place an AR object 14 in the real-world space 10. FIG. 1A illustrates the AR object 14 placed at a depth behind the real-world object 15. However, only a portion of the AR object 16 (greyed out) is behind the real-world object 15 based on depth and position of the real-world object 15 as compared to depth and position of the AR object 14.

Figure 1B:
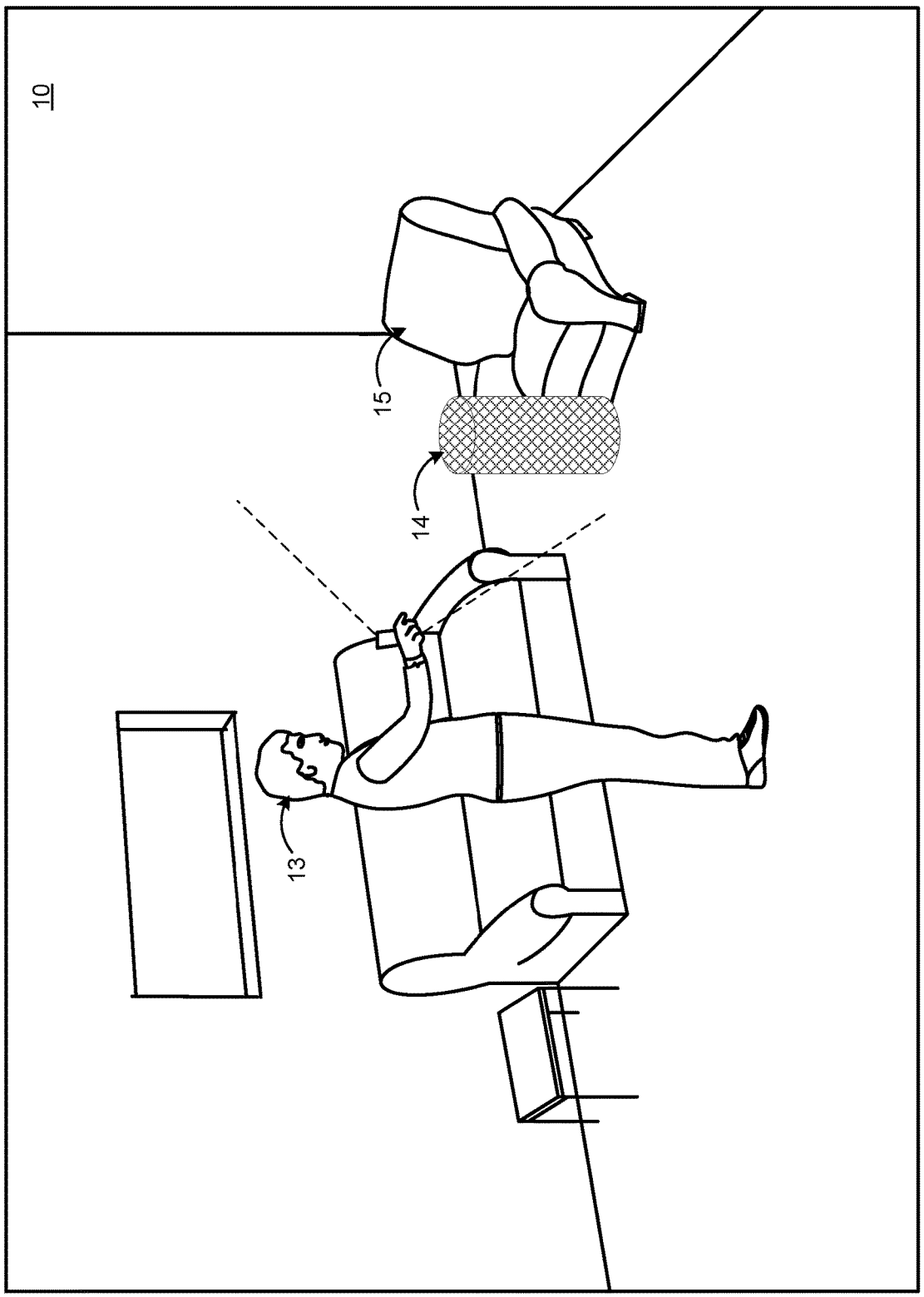
FIG. 1B is a diagram illustrating another example real-world space.

FIG. 1B again illustrates the AR object 14 in the real-world space 10. In FIG. 1B the AR object has been repositioned and placed at a depth in front of the real-world object 15.

Figure 1C:
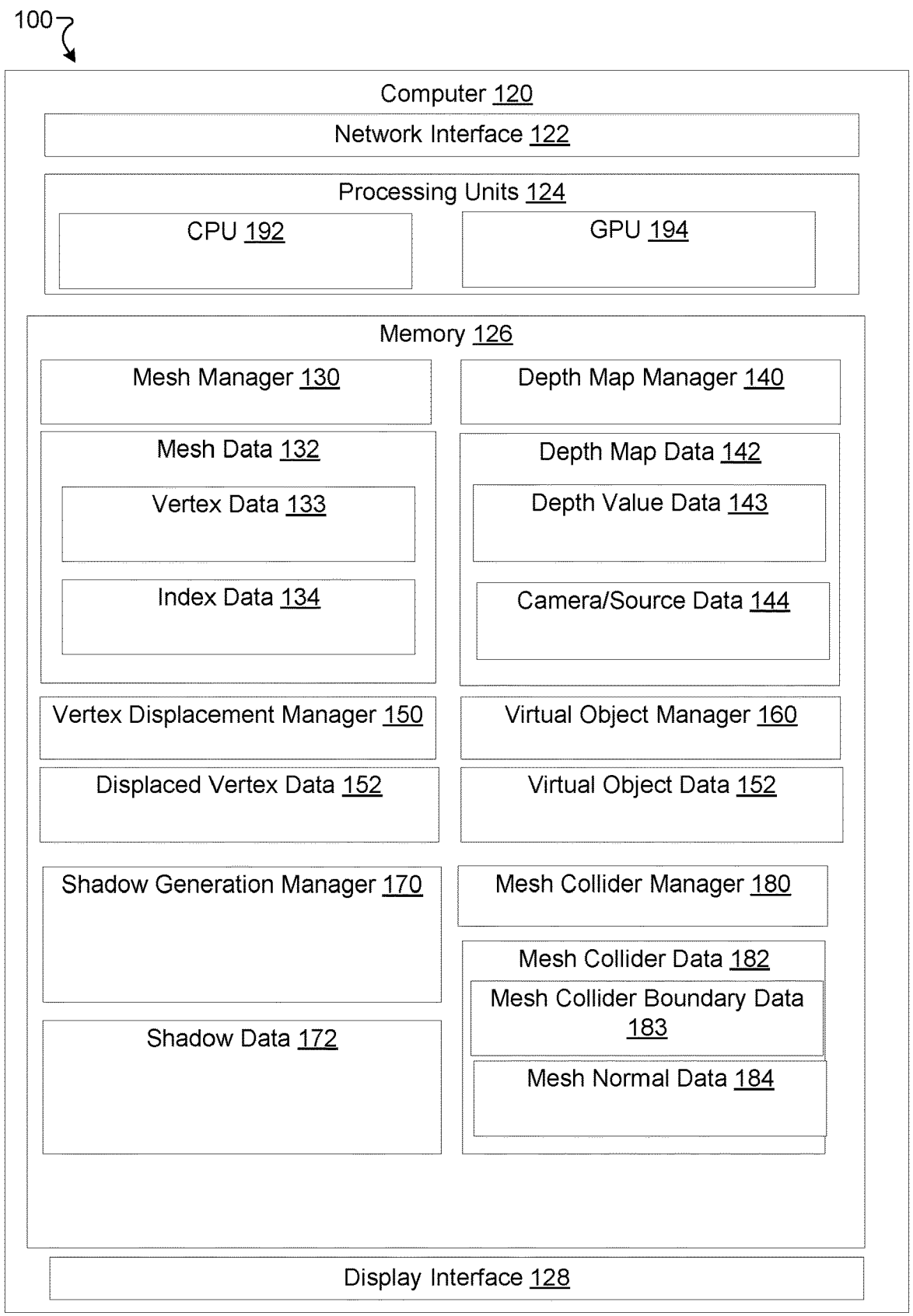
FIG. 1C is a diagram that illustrates an example electronic environment in which improved techniques described herein may be implemented.

FIG. 1C is a diagram that illustrates an example electronic environment 100 in which the above-described technical solution may be implemented. The electronic environment 100 includes a computer 120 configured to introduce virtual objects into a physical environment in an AR system.

The computer 120 includes a network interface 122, one or more processing units 124, memory 126, and a display interface 128. The network interface 122 includes, for example, Ethernet adaptors, Token Ring adaptors, and the like, for converting electronic and/or optical signals received from the network 150 to electronic form for use by the computer 120. The set of processing units 124 include one or more processing chips and/or assemblies, including a central processing unit (CPU) 192 and a graphics processing unit (GPU) 194. In some implementations, the GPU 194 is optimized to handle mesh data representing three-dimensional objects. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include a mesh manager 130, a depth map manager 140, a vertex displacement manager 150, a virtual object manager 160, shadow generation manager 170, collider mesh manager 180, and a rendering manager 190. Further, as illustrated in FIG. 1, the memory 126 is configured to store various data, which is described with respect to the respective managers that use such data. Note that, in some implementations, an entity page corresponds to an offer page that includes an offer to sell a product.

The mesh manager 130 is configured to generate, receive, or acquire mesh data 132. In some implementations, the mesh manager 130 generates the mesh data 132 for a mesh template based on a uniform grid over a field of view of a camera from which the physical environment is seen. In some implementations, the mesh manager 130 is configured to receive or acquire the image data 132 over the network interface 122, i.e., over a network (such as network 190) from the display device 170. In some implementations, the image manager 130 is configured to receive or acquire the image data 132 from local storage (e.g., a disk drive, flash drive, SSD, or the like).

In some implementations, the mesh manager 130 is configured to generate the mesh data 132 on the CPU 192. In this case, the mesh manager 130 is configured to copy the mesh data 132 from the CPU 192 to the GPU 194. In this way, the AR system, via the computer 120, is able to process vertex displacements efficiently. In some implementations, the mesh manager 130 is configured to generate the mesh data 132 procedurally on the GPU 194.

The mesh data 132 represents a triangular mesh that in turns the physical environment, sampled at regular locations in the physical environment. The mesh data 132 includes vertex data 133 and index data 134.

The vertex data 133 represents a plurality of vertices, each initially at regularly sampled locations within the physical environment. Four neighboring vertices can form a pixel of the triangular mesh. Each vertex of the plurality of vertices is represented by, in some implementations, a pair of numbers representing a coordinate within a coordinate plane. In some implementations, each vertex of the plurality of vertices is represented by a triplet of numbers, one of the triplet being set to zero. In some implementations, the coordinates are real numbers. In some implementations, the coordinates are integers derived from a quantization procedure.

The index data 134 represents a connectivity of the triangular mesh. In some implementations, the index data 134 includes a plurality of indices, each of the plurality of indices corresponding to a vertex of the plurality of vertices. The plurality of indices are arranged in a plurality of triplets of numbers, each triplet corresponding to a triangle of the mesh as shown in FIG. 4B. Each triplet is arranged in a specified winding order. For example, each triplet is arranged in a clockwise direction when the normal to each triangle is outward facing.

The depth map manager 140 is configured to generate depth map data 142 in real time. In some implementations, the depth map manager 140 does not perform a three-dimensional scanning of the physical environment as that may interrupt a real-time flow of information and degrade the user experience. Rather, in some implementations, the depth map manager 140 uses a dedicated time-of-flight (ToF) depth sensor available on some mobile devices. In some implementations, the depth map manager 140 uses a stereo camera to generate the depth map data 142. In some implementations, the depth map manager 140 uses a monocular camera in conjunction with software to generate the depth map data 142. In some implementations, the depth map manager 140 generates the depth map data 142 in the GPU 194 at short but regular intervals (e.g., every 10-20 ms).

The depth map data 142 includes a real-time mesh representation of a depth map in the GPU 194. The depth map is a perspective camera image that includes a depth value rather than a color/grayscale value in each pixel. In some implementations, each pixel of the depth map corresponds to a respective pixel of the triangular mesh. An example of such a depth map may be found in FIG. 4A. The depth map data 142 includes depth value data 143 and camera/source data 144.

The depth value data 143 represents the depth values at each pixel of the mesh representing the depth map. In some implementations, the depth values are measure along a ray traced from an illumination source (e.g., a lamp, the sun) that illuminates the physical environment. The depth values are, in some implementations, real numbers representing a depth measurement. In some implementations, the depth values are integers resulting from a quantization process or integers representing a number of pixels.

The camera/source data 144 represents a position and direction from which the depth value data 143 is generated. In some implementations, the camera/source data 144 includes a triplet of real numbers representing an illumination source and a pair of real numbers (e.g., polar and azimuthal angles) or a pair of real numbers and a signed value (e.g., direction cosines) representing a direction. In some implementations, depth map manager 140 is configured to subtract from the depth values at each pixel a minimum distance to the illumination source. In some implementations, the depth values at each pixel is a longitudinal component of the distance alone a ray of the illumination.

The camera/source data 144 also includes, in some implementations, a set of real numbers or integers (i.e., numbers of pixels) representing values of camera parameters. In some implementations, the camera parameters represent a pinhole camera model. A camera pinhole model assumes that the camera is a pinhole camera (i.e., a box with a pinhole on one side and an image plane on the opposite side). Parameters of a camera pinhole model include an image width, image height, a focal length in the direction of the image width, a focal length in the direction of the image height, a principal point in the direction of the image width, and a principal point in the direction of the image height. In some implementations, the focal lengths in both directions are equal to the distance between the pinhole and image plane. The principal point is a location of an intersection between a line passing through the center of the pinhole and the image plane.

The vertex displacement manager 150 is configured to generate displaced vertex data 152 based on the mesh data 132 and the depth map data 142, specifically the vertex data 133, the depth value data 143, and the camera/source data 144. The vertex displacement manager 150 displaces the vertices according to the following formula:

$$X' = (X - P_x)\frac{Z}{F_x}, \qquad (1)$$

$$Y' = -(Y - P_y)\frac{Z}{F_y}, \qquad (2)$$

where (X, Y) are coordinates of a vertex the mesh template (i.e., vertex data 133), (X', Y') are coordinates of the displaced vertices (i.e., displaced vertex data 152), Z represents the depth value at the pixel corresponding to the pixel including the vertex at (X, Y), ($F_x$, $F_y$) represent the focal lengths of the pinhole camera as defined above, and ($F_x$, $F_y$) represent the principal points of the pinhole camera as defined above.

The displaced vertex data 152 represents the displaced vertices according to Eqs. (1) and (2). The displaced vertex data 152, in some implementations, includes triplets of numbers (real of integers) representing coordinates of a displaced vertex. In some implementations, the resulting mesh represented by the displaced vertex data 152 has a connectivity defined by the index data 134, as the connectivity of the mesh in such implementations is assumed not to change over time.

In some implementations, the vertex displacement manager 150 is configured to remove vertices from the triangular mesh when the depth map satisfies a criterion. In some implementations, the criterion includes a difference being greater than a threshold, the difference being between (i) the depth value of the depth map corresponding to the vertex and (ii) an average of the depth value of the depth map corresponding to the vertex and the depth values corresponding to a set of neighboring vertices of the plurality of vertices.

Figure 3A:
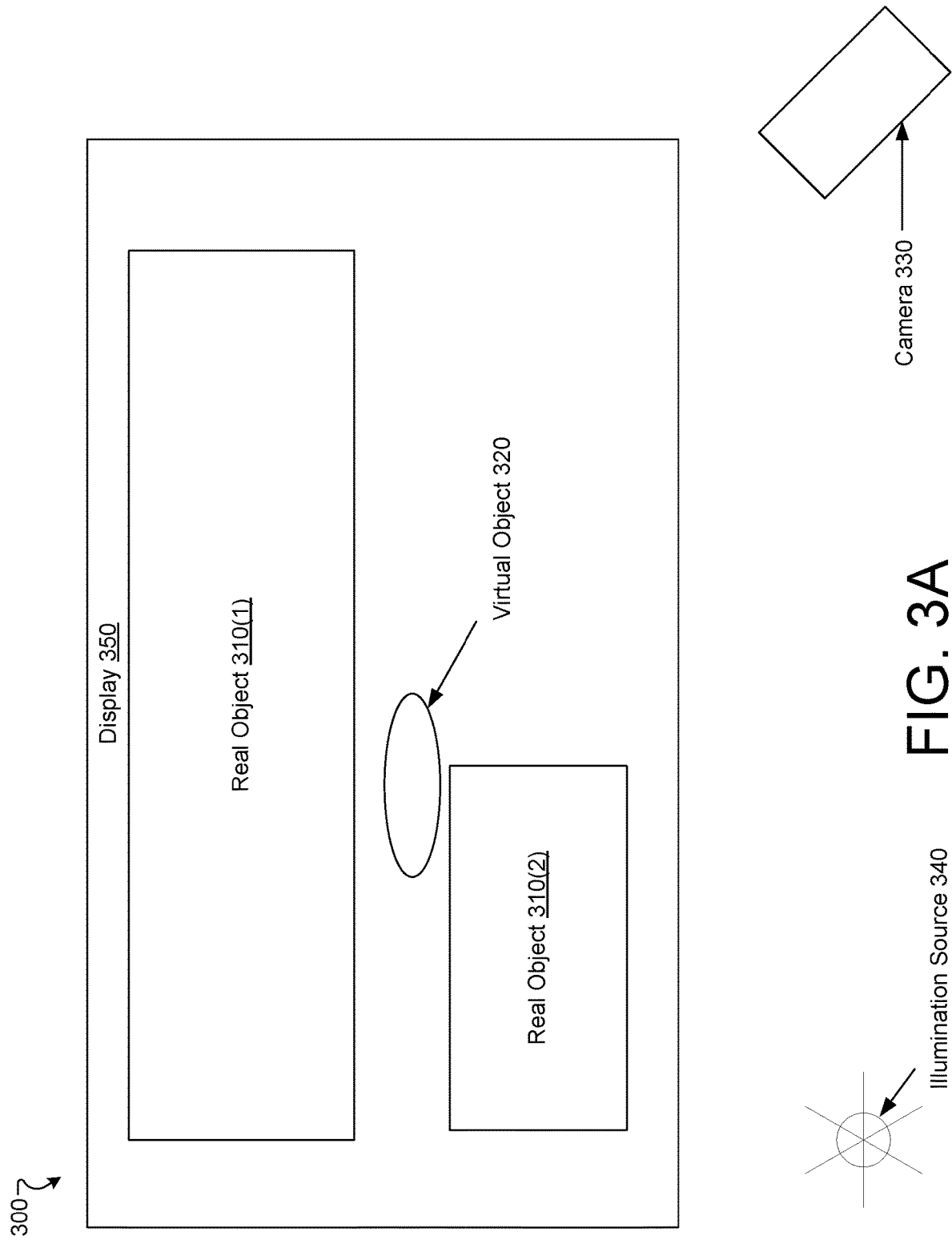
FIG. 3A is a diagram illustrating a top view of an example physical environment imaged in an augmented reality system.
Figure 3B:
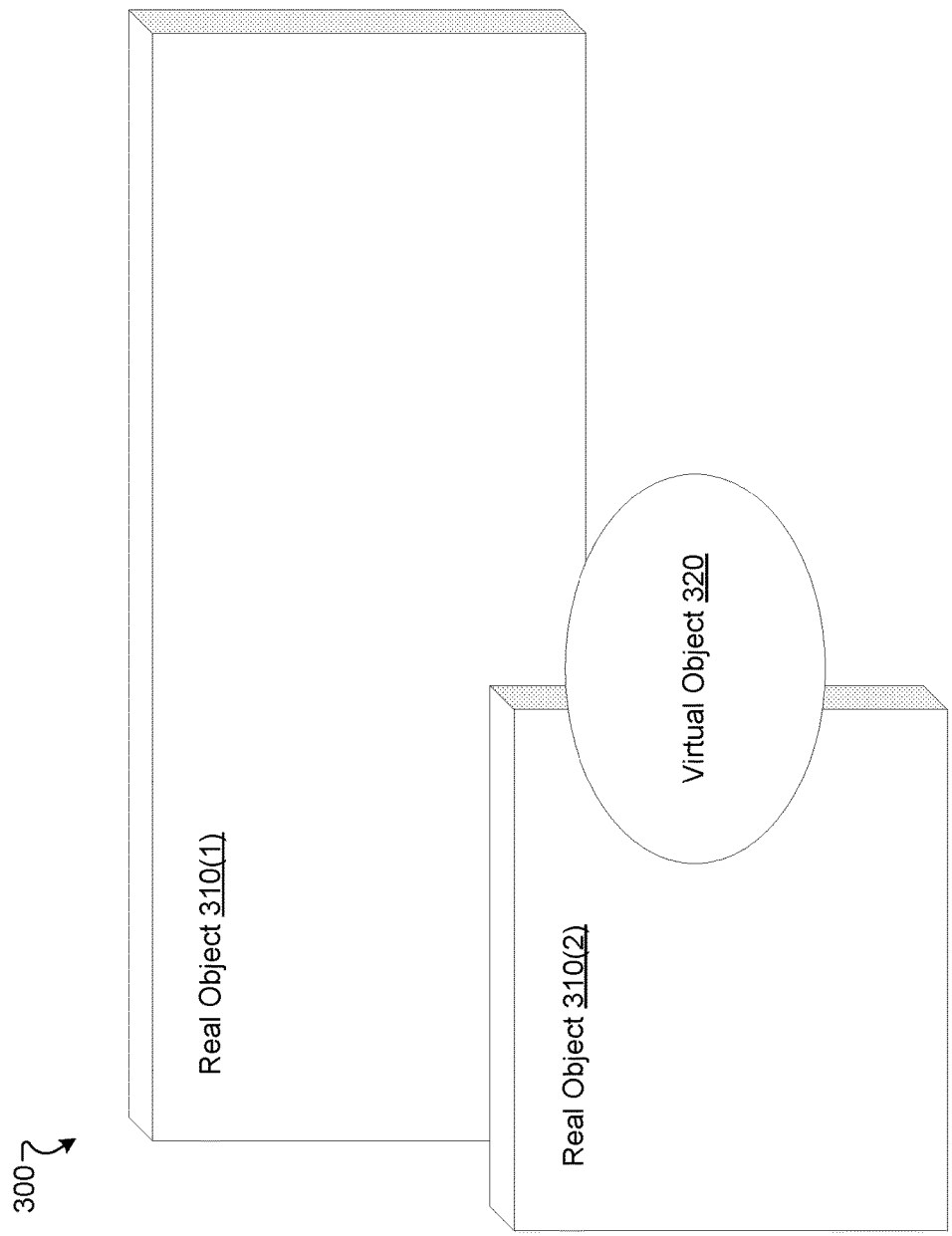

The virtual object manager 160 is configured to generate, receive, or acquire virtual object data 162 cause the GPU 194 to place a virtual object represented by the virtual object data 162 to interact with the mesh containing the displaced vertices represented by the displaced vertex data 152. By displacing the vertices, the computer 120 is able to occlude the virtual object with real objects, rather than simply placing the virtual object in front of a real object. This is shown in FIGS. 3A-3C. In addition, the computer 120 is able to render shadows on real and virtual objects and simulate the physics of collisions between real and virtual objects. In this way, the virtual object manager 160 alters the virtual object according to the displaced vertices.

The shadow generation manager 170 is configured to generate shadow data 172 representing shadows generated by real and virtual objects based on the illumination source. In some implementations, the shadow generation manager 170 is configured to modify rendering parameters of the mesh on a display to only receive shadows on an otherwise transparent mesh. In some implementations, the shadow generation manager 170 is configured to render shadows after an initial camera feed is displayed but before any objects are shown.

The shadow data 172 represents shadows cast onto real and/or virtual objects in the physical environment. In some implementations, the shadow data 172 includes color values that are products of initial color values of pixels in the mesh representing the physical environment and color value of a shadow. In some implementations, the color value of a shadow is zero (black).

The mesh collider manager 180 is configured to generate mesh collider data 182 (e.g., cook a collision mesh) that supports arbitrarily-shaped kinematic objects by allowing virtual rigid body objects to collide with, bounce from, and splatter on real objects in the physical environment. In some implementations, the mesh collider manager 180 is configured to generate mesh collider data 182 only when a rigid body is introduced or manipulated into the field of view (FoV) of the scene in the physical environment. In some implementations, the mesh collider manager 180 is configured to extend boundaries of the mesh collider toward an image plane of the camera to prevent rigid bodies from disappearing from the display. In some implementations, the mesh collider manager 180 is configured to compute normals to the collider mesh in the vicinity of a vertex using a cross product of vectors formed by neighboring vertices.

The mesh collider data 182 represents a mesh collider used to simulate collision physics in the physical environment between a kinematic virtual object (e.g., a rigid body) and a real object. The mesh collider data 182 includes mesh collider boundary data 182 representing the boundary of the mesh collider that may be extended toward a camera image plane.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1, including combining functionality illustrated as two components into a single component.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the computer 120 can be, or can include, processors configured to process instructions stored in a memory. For example, an mesh manager 130 (and/or a portion thereof), a depth map manager 140 (and/or a portion thereof), a vertex displacement manager 150 (and/or a portion thereof), a virtual object manager 160 (and/or a portion thereof), a shadow generation manager 170 (and/or a portion thereof), and a mesh collider manager 180 can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120. As illustrated in FIG. 1, the memory 126 is configured to store various data, including mesh data 132, depth map data 142, displaced vertex data 152, virtual object data 162, shadow data 172, and mesh collider data 182.

Figure 2:
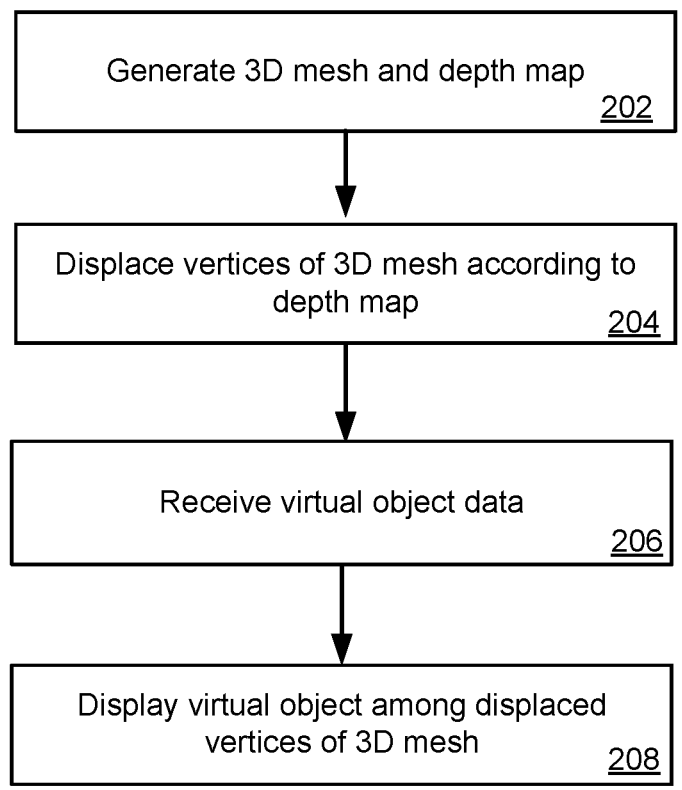
FIG. 2 is a flow chart that illustrates an example method of operating an augmented reality system, according to disclosed implementations.

FIG. 2 is a flow chart depicting an example method 200 of introducing virtual objects into a physical environment in an AR system according to the above-described improved techniques. The method 200 may be performed by software constructs described in connection with FIG. 1, which reside in memory 126 of the computer 120 and are run by the set of processing units 124.

At 202, the mesh manager 130 generates a triangular mesh (e.g., mesh data 132) representing a physical environment and the depth map manager 140 generates a depth map (e.g., depth map data 142) of the physical environment, the triangular mesh including a plurality of vertices (e.g., vertex data 133), the depth map including a plurality of depth values (e.g., depth value data 143). In some implementations, the mesh manager 130 generates, as the triangular mesh, a grid of regularly spaced vertices over the FoV of a camera viewing a scene within the physical environment. In some implementations, the mesh manager 130 also generates a plurality of indices (e.g., index data 134) representing a connectivity of the mesh. In some implementations, the mesh manager 130 generates depth values represented by the depth map data 142 along a direction of a ray (e.g., camera/source data 144) emanating from an illumination source.

At 204, the vertex displacement manager 150 performs a displacement operation on the plurality of vertices of the triangular mesh to produce a plurality of displaced vertices (e.g., displaced vertex data 152) representing a geometry of at least one real object within the physical environment, the displacement operation being based on the depth map. In some implementations, the vertex displacement manager 150 is configured to remove vertices from the triangular mesh when the depth map satisfies a criterion. In some implementations, the criterion includes a difference being greater than a threshold, the difference being between (i) the depth value of the depth map corresponding to the vertex and (ii) an average of the depth value of the depth map corresponding to the vertex and the depth values corresponding to a set of neighboring vertices of the plurality of vertices.

At 206, the virtual object manager 160 receives virtual object data (e.g., virtual object data 162) representing a virtual object configured to be displayed with the at least one real object in the physical environment. A virtual object is defined, in some implementations, with shape and texture parameter values. In some implementations, a virtual object is defined using a mesh.

At 208, the computer 120 displays the virtual object in the physical environment on a display to produce a displayed virtual object, the displayed virtual object having a difference from the virtual object according to the plurality of displaced vertices. In one example, the displayed virtual object may be occluded by a real object. In another example, the displayed virtual object may have a shadow cast on it by a real object or may cast a shadow on a real object. In another example, the displayed virtual object may be splattered after a collision with a real object.

FIG. 3A is a diagram illustrating a top view of an example scene within a physical environment 300 imaged in an AR system on a display 350. As shown in FIG. 3A, the physical environment 300 includes real objects 310(1) and 310(2). The AR system has generated and inserted a virtual object 320 in the display 350 so as to appear placed within the virtual environment 300. In this case, the virtual object 320 appears between the real objects 310(1) and 310(2). Providing perspective for the scene is a camera 330 and illuminating the scene is an illumination source 340. Based on the camera's perspective, the virtual object 320 should be occluded by the real object 310(2).

FIG. 3B is a diagram illustrating a front view of the physical environment 300 as imaged by the camera 330 within an AR system that does not use depth map information to define the real objects 310(1) and 310(2). In this case, the virtual object 320 appears in front of the real object 310(2) even though it is placed between real objects 310(1) and 310(2).

FIG. 3C is a diagram illustrating the front view of the physical environment 300 as imaged by the camera 330 within an AR system that uses the depth map information along rays emanating from the illumination source 340 to define the real objects 310(1) and 310(2). In this case, the virtual object 320 appears occluded by the real object 310(2) because it is placed between real objects 310(1) and 310(2).

Figure 4A:
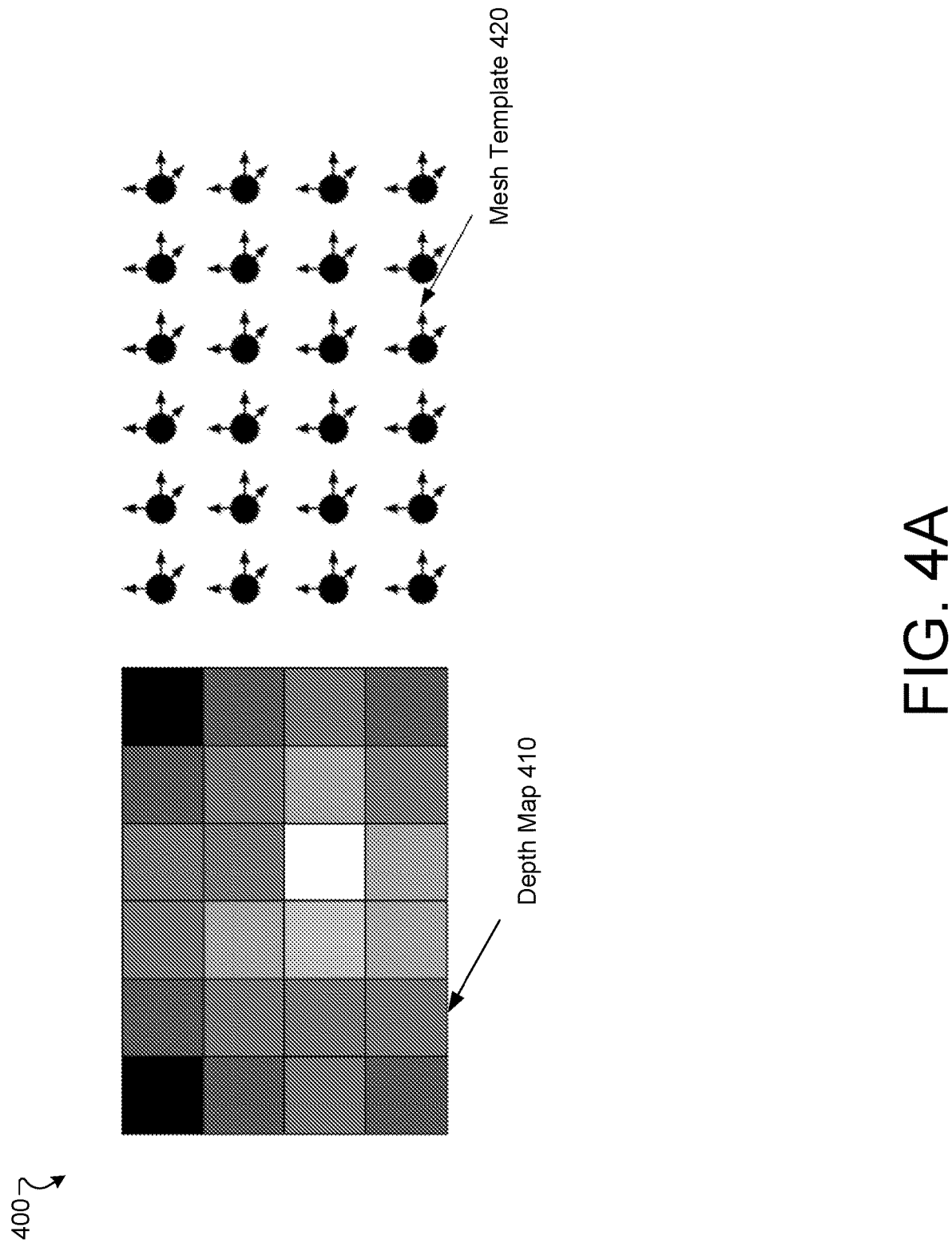
FIG. 4A is a diagram illustrating an example depth map and mesh template.
Figure 4B:
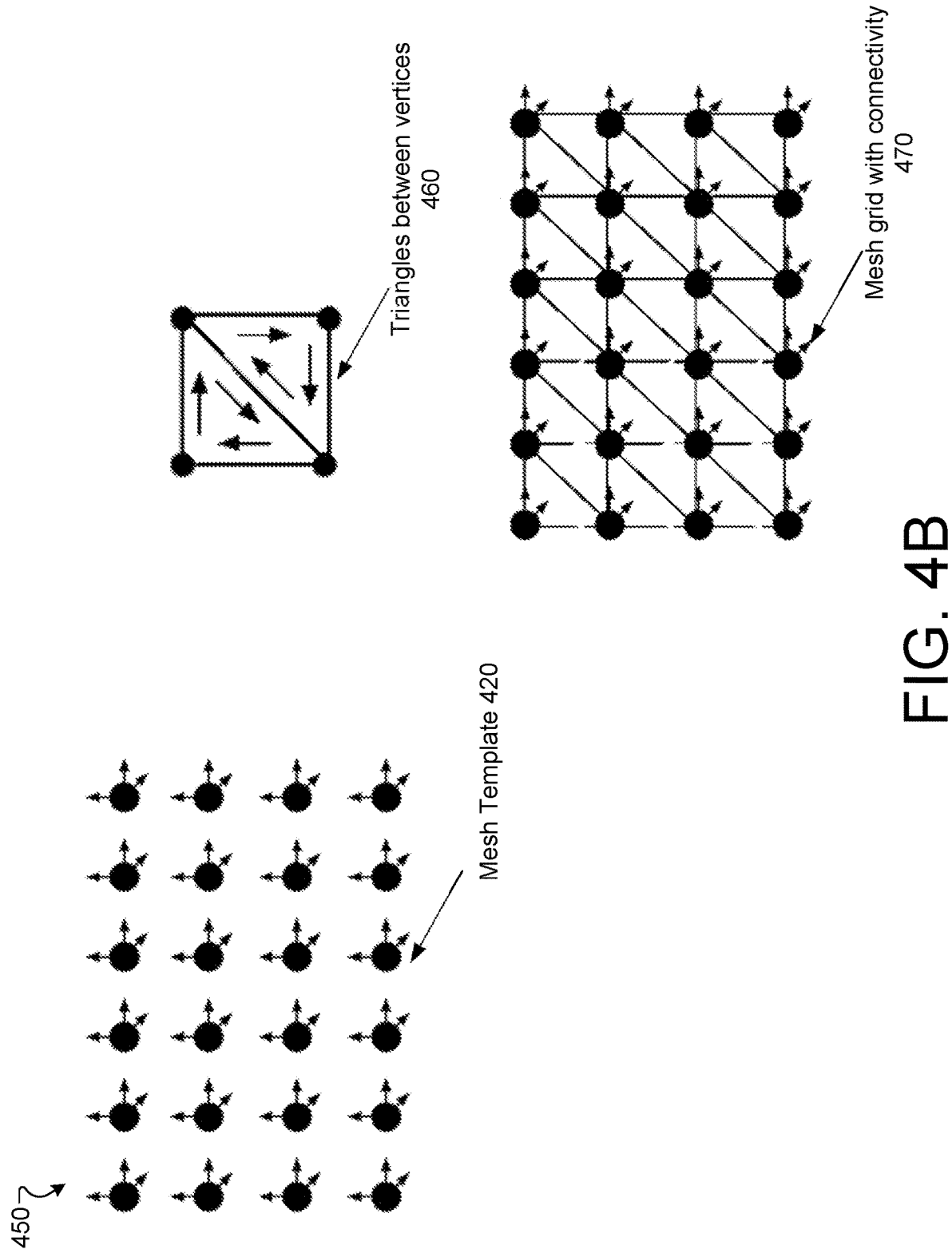
FIG. 4B is a diagram illustrating an example mesh template and a representation of its connectivity.

FIG. 4A is a diagram illustrating an example representation 400 of a physical environment in an AR system. The representation 400 incudes a depth map 410 and mesh template 420.

The depth map 410 is a perspective camera image that contains a depth value instead of color in each pixel. The depth map 410 can be directly used in AR rendering, for example in a fragment shader to selectively hide parts of virtual objects that are occluded by a real object. The depth map 410 is shown as an array of pixels having various shadings. Each shading represents a depth value. For example, if there are 128 gray levels, then there are 128 integral possible depth values. Each pixel of the depth map 410 corresponds to a location in a regular grid over the FoV of a scene in the physical environment.

The mesh template 420 is an initial mesh generated by the AR system over the FoV of the scene in the physical environment. The vertices of the mesh template 420 are arranged in a regular grid prior to any vertex displacement operation. Each vertex of the mesh template 420 corresponds to a pixel of the depth map 410.

FIG. 4B is a diagram illustrating the example representation 400 of the physical environment in the AR system including the connectivity of the vertices of the template mesh 420. The connectivity between vertices (vertex connectivity) that represent scene depth values corresponds to that of a pixel grid of a depth map. The connectivity is represented by a pair of triangles 460 between a quadruplets of vertices that form a square. The connectivity of the mesh template 420 is then represented by a series of triangles to form a triangular mesh 470.

The vertex connectivity does not change over time. The vertices of the template mesh 420 are stored in a vertex buffer. The connectivity of these vertices is represented in a triangle or index buffer that contains a sequence of indices corresponding to vertices in the vertex buffer. Each three indices in the index buffer describe a triangle primitive. The order within the triplet conforms with a winding order of the graphics framework within which the AR system operates. For example, a clockwise winding order renders a outward-facing triangle. The vertex buffer and the index buffer are initially stored in a memory of the CPU 192 and copied to a memory of the GPU 194 only once during initialization.

Figure 5:
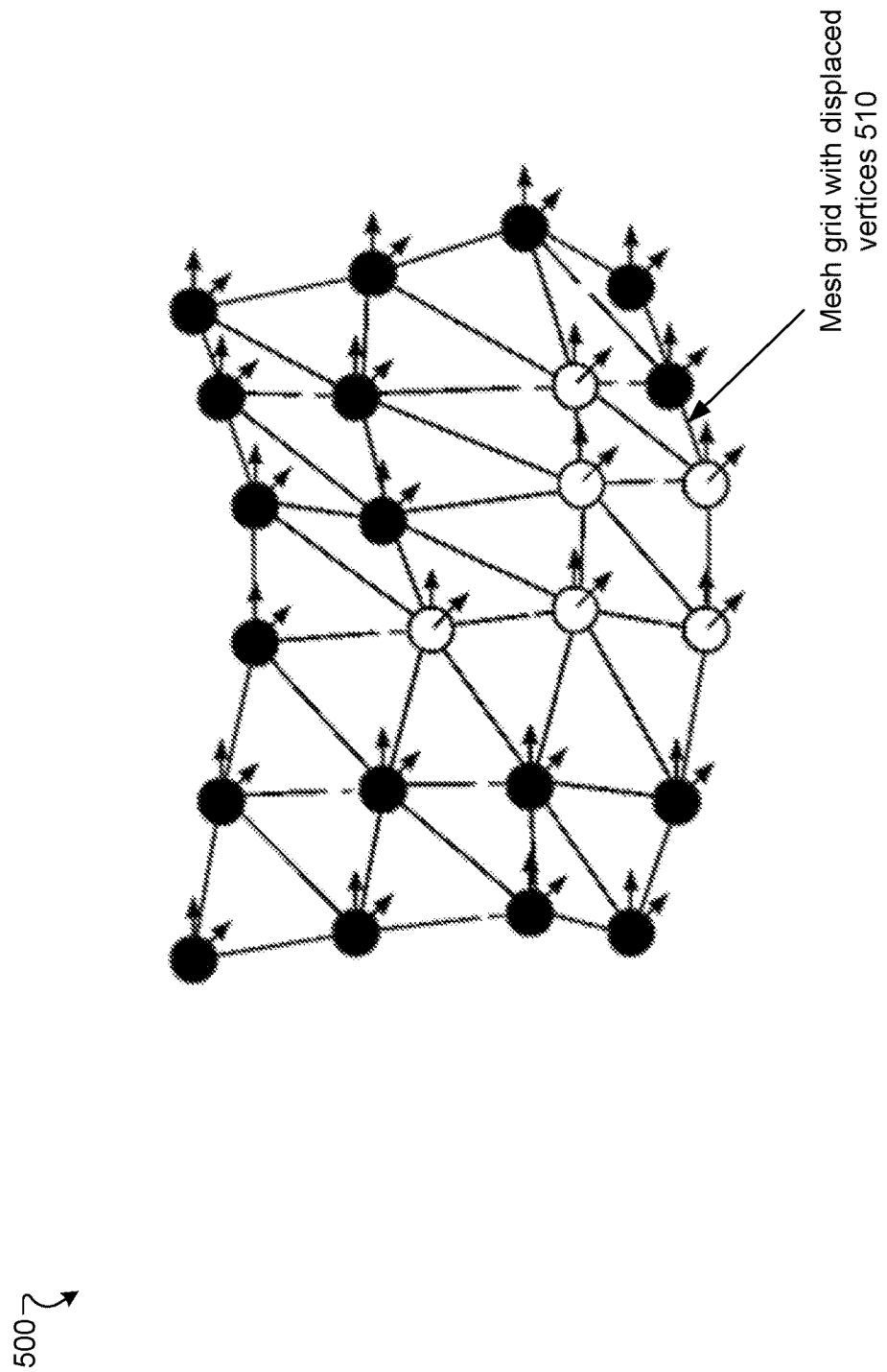
FIG. 5 is a diagram illustrating a mesh with vertices displaced according to a depth map according to disclosed implementations.

FIG. 5 is a diagram illustrating an example representation of a physical environment 500 with a mesh 510 with vertices displaced according to a depth map (e.g., depth map 410). The values of the new vertex positions can be calculated in the vertex shader based on the camera pinhole model given the x and y pixel location of the current depth pixel, the depth value, and the camera parameters as described in Eqs. (1) and (2) above. No additional data transfer between the CPU 192 and the GPU 194 is required during render time, which provides an increased efficiency to this method of introducing virtual objects into the physical environment in the AR system.

Figure 6:
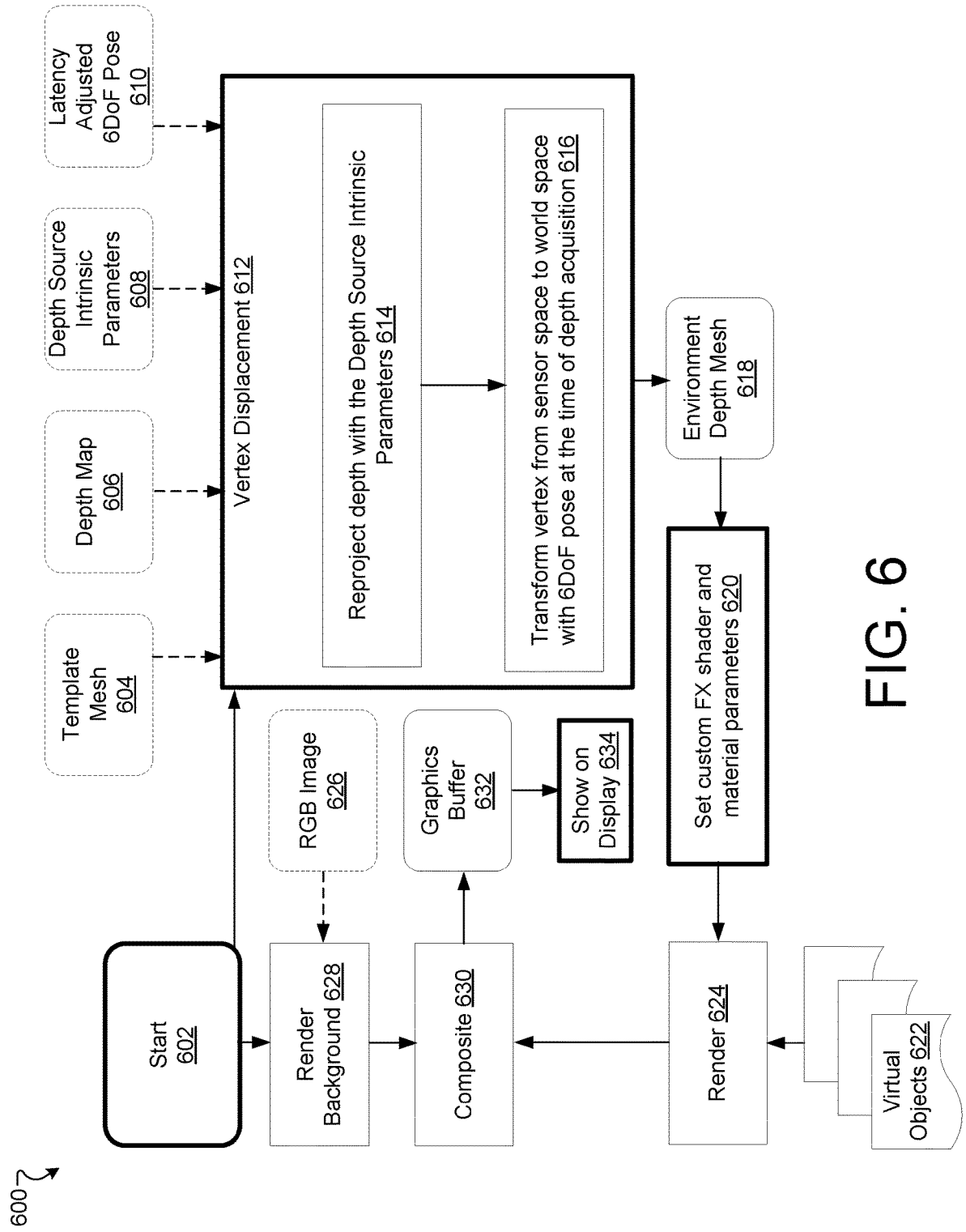
FIG. 6 is a diagram illustrating an example AR system and its components according to disclosed implementations.

FIG. 6 is a diagram illustrating an example process 600 of introducing virtual objects into a physical environment of AR system.

From a start 602, the process 600 begins a step 612 of displacing vertices, which takes as input a template mesh 604, a depth map 606, depth source intrinsic parameters (i.e., pinhole camera model) parameters 608, and a latency-adjusted six degree of freedom (6DoF) pose 610.

The vertex displacement 612 includes a reprojection 614 of depth using the depth map 606 and the depth source intrinsic parameters 608. That is, the displacement of the vertices is based on the pinhole camera model parameter values. The depth values are measured along rays from an illumination source. Then, at 616, the displaced vertex is transformed from sensor space (i.e., two-dimensional mesh) to world space (i.e., three-dimensional mesh) based on the latency-adjusted six degree of freedom (6DoF) pose 610.

At 618, the process 600 generates an environment depth mesh. Based on the environment depth mesh 618, the process 600 sets a custom FX shader and material parameters 620. The shader and material parameters are then input, along with data defining virtual objects 622, into a renderer 624.

Also from the start 602, the process 600 includes a rendering 628 of a background based on an RGB image 626. The output of the rendering 628 and the output of the rendering 624 are combined to produce a composite image 630. The composite image is input 632 into a graphics buffer and shown 634 on the display.

Figure 7:
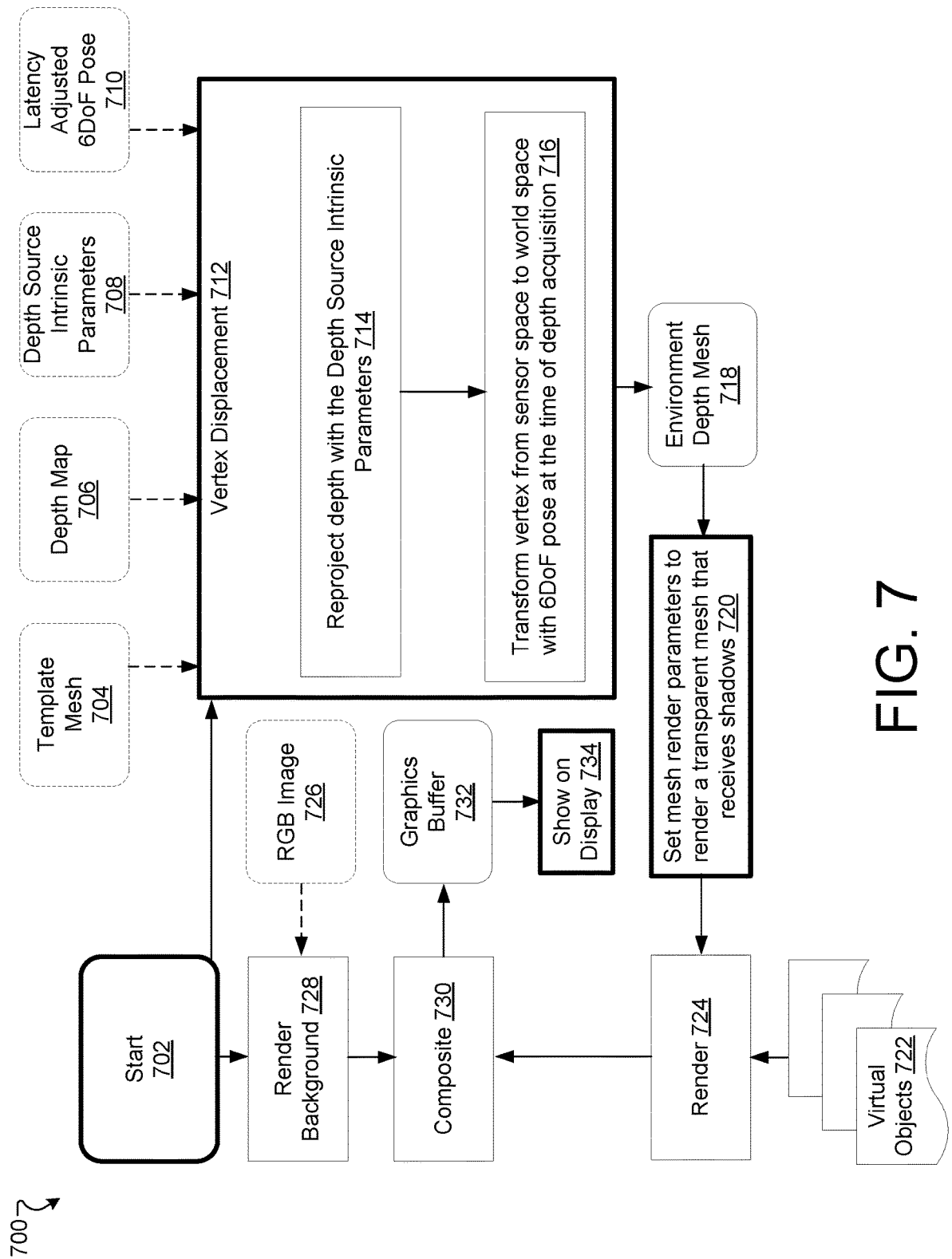
FIG. 7 is a diagram illustrating an example AR system with shadow mapping and its components according to disclosed implementations.

FIG. 7 is a diagram illustrating an example process 700 of introducing shadows into a physical environment of AR system.

From a start 702, the process 700 begins a step 712 of displacing vertices, which takes as input a template mesh 704, a depth map 706, depth source intrinsic parameters (i.e., pinhole camera model) parameters 708, and a latency-adjusted six degree of freedom (6DoF) pose 710.

The vertex displacement 712 includes a reprojection 714 of depth using the depth map 706 and the depth source intrinsic parameters 708. That is, the displacement of the vertices is based on the pinhole camera model parameter values. The depth values are measured along rays from an illumination source. Then, at 716, the displaced vertex is transformed from sensor space (i.e., two-dimensional mesh) to world space (i.e., three-dimensional mesh) based on the latency-adjusted six degree of freedom (6DoF) pose 710.

At 718, the process 700 generates an environment depth mesh. Based on the environment depth mesh 718, the process 700 sets mesh render parameters to render a transparent mesh that receives shadows 720. The mesh render parameters are then input, along with data defining virtual objects 722, into a renderer 724.

Also from the start 702, the process 700 includes a rendering 728 of a background based on an RGB image 726. The output of the rendering 728 and the output of the rendering 724 are combined to produce a composite image 730. The composite image is input 732 into a graphics buffer and shown 734 on the display.

Figure 8:
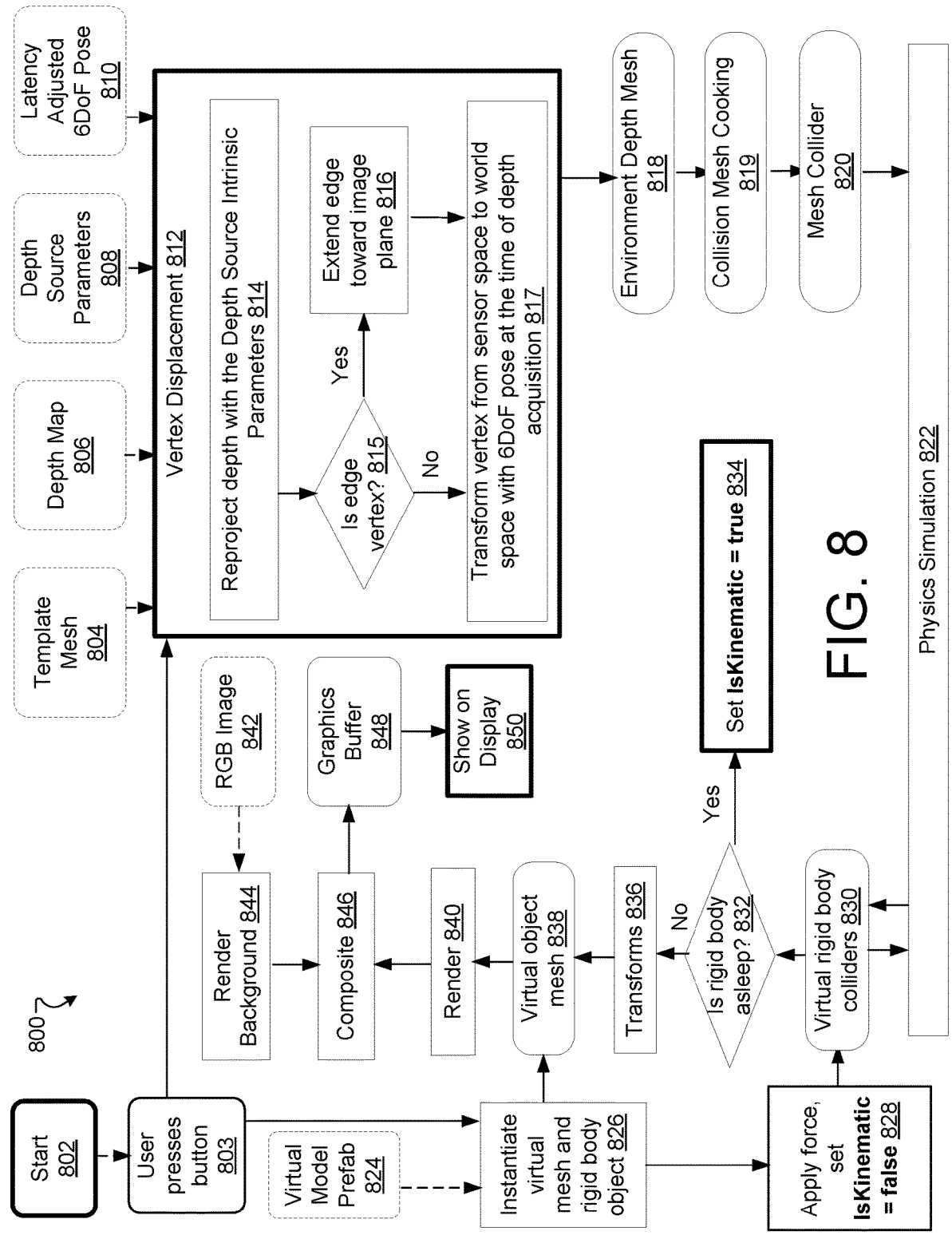
FIG. 8 is a diagram illustrating an example AR system with a physics simulator and its components according to disclosed implementations

FIG. 8 is a diagram illustrating an example process 800 of introducing collision physics simulations into a physical environment of AR system.

From a start 802 and a trigger from a user 803 (e.g., a push of a button or a touch of a screen), the process 800 begins a step 812 of displacing vertices, which takes as input a template mesh 804, a depth map 806, depth source intrinsic parameters (i.e., pinhole camera model) parameters 808, and a latency-adjusted six degree of freedom (6DoF) pose 810.

The vertex displacement 812 includes a reprojection 814 of depth using the depth map 806 and the depth source intrinsic parameters 808. That is, the displacement of the vertices is based on the pinhole camera model parameter values. The depth values are measured along rays from an illumination source. Then, at 817, the displaced vertex is transformed from sensor space (i.e., two-dimensional mesh) to world space (i.e., three-dimensional mesh) based on the latency-adjusted six degree of freedom (6DoF) pose 810. Nevertheless, if it is determined at 815 that the vertex being displaced is on a boundary of the mesh, then at 816, the boundary is extended toward an image plane of the camera.

The vertex displacement 812 is repeated to create an environment depth mesh 818. This mesh is used as input to a collision mesh cooking operation 819 which produces a mesh collider 820. The mesh collider 820 in turn is configured for operating physics simulations 822.

Another consequence of the user trigger at 803 is, with additional virtual model prefab input 824, to perform an instantiation 826 of a virtual mesh and a rigid body object defined by the virtual mesh. Then the parameter isKinematic (which, if enabled, indicates that the rigid body object will not be driven by a physics engine, but rather can only be manipulated by a transform) is set to false at 828. At 830, the virtual rigid body colliders are generated; the virtual rigid body colliders are both fed into, and are fed out from, the physics simulation 822. If the rigid body is determined to be asleep (i.e., rigid body does not move) at 832, then the parameter isKinematic is set to True at 834. That is, in some implementations, the rigid body is not woken up; this maintaining the sleeping of the rigid body increases efficiency. Otherwise, the process 800, at 836, obtains the transform of the rigid body object and, at 838, generates a virtual body mesh with input from the instantiation of the virtual mesh and rigid body object at 828. The virtual object mesh is rendered at 840.

The process 800 also includes a rendering 844 of a background based on an RGB image 842. The output of the rendering 840 and the output of the rendering 844 are combined to produce a composite image 846. The composite image is input 848 into a graphics buffer and shown 850 on the display.

Figure 9:
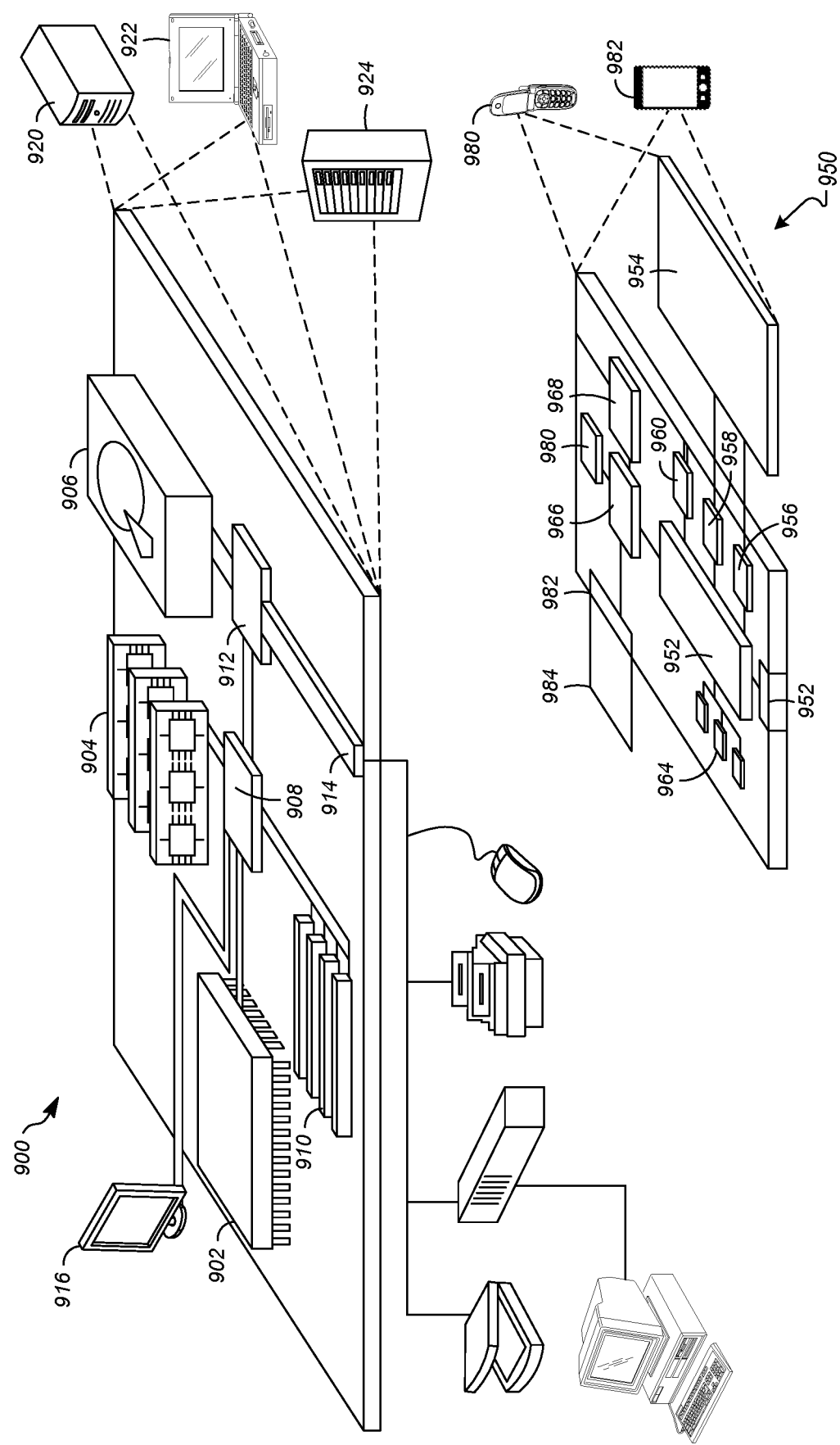
FIG. 9 is a diagram illustrating an example of a computer device and a mobile computer device that can be used to implement the described techniques.

FIG. 9 illustrates an example of a generic computer device 900 and a generic mobile computer device 950, which may be used with the techniques described here. Computer device 900 is one example configuration of computer 120 of FIG. 1.

As shown in FIG. 9, computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 904 stores information within the computing device 600. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 600. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
   generating a triangular mesh representing a physical environment and a depth map of the physical environment, the triangular mesh including a plurality of vertices, the depth map including a plurality of depth values;
   performing a displacement operation on the plurality of vertices of the triangular mesh including removing a vertex of the plurality of vertices of the triangular mesh in response to the depth map satisfying a criterion to produce a plurality of displaced vertices representing a geometry of at least one real object within the physical environment;
   receiving virtual object data representing a virtual object configured to be displayed with the at least one real object in the physical environment; and
   displaying the virtual object in the physical environment on a display to produce a displayed virtual object, the displayed virtual object having a difference from the virtual object according to the plurality of displaced vertices.

2. The method as in claim 1, wherein performing the displacement operation includes:
   displacing each of the plurality of vertices of the triangular mesh according to a pinhole camera model.

3. The method as in claim 1, wherein the criterion includes a difference being greater than a threshold, the difference being between the depth value of the depth map corresponding to the vertex and an average of the depth value of the depth map corresponding to the vertex and the depth values corresponding to a set of neighboring vertices of the plurality of vertices.

4. The method as in claim 1, wherein the triangular mesh further includes a plurality of indices indicating a connectivity of the triangular mesh, each of the plurality of indices corresponding to a respective vertex of the plurality of vertices of the triangular mesh, the connectivity of the triangular mesh being constant over time.

5. The method as in claim 4, wherein the plurality of indices are arranged in a plurality of triplets of indices, each of the plurality of triplets of indices representing a triangle of the triangular mesh and being arranged in an order representing a specified winding order.

6. The method as in claim 4, wherein generating the triangular mesh includes:
   storing the plurality of vertices and the plurality of indices of the triangular mesh in a first buffer in a memory in a central processing unit (CPU); and
   copying the plurality of vertices and the plurality of indices to a second buffer in a memory of a graphics processing unit (GPU).

7. The method as in claim 1, wherein generating the depth map includes:
   generating the depth values of the depth map along a ray emanating from a light source in a vicinity of the physical environment.

8. The method as in claim 1, further comprising, prior to receiving the virtual object data:
   rendering the triangular mesh having the plurality of displaced vertices as a transparent mesh to the display; and
   rendering first shadows on the transparent mesh based on the depth map.

9. The method as in claim 8, wherein displaying the virtual object in the physical environment on the display includes:
   rendering second shadows on the triangular mesh based on the displayed virtual object.

10. The method as in claim 1, further comprising:
    generating a mesh collider based on the triangular mesh, the mesh collider being configured to detect collisions between the at least one real object and the virtual object, the mesh collider including a set of vertices.

11. The method as in claim 10, further comprising:
    determining a field of view (FOV) of a camera within which the virtual object in the physical environment is displayed;
    extending a boundary of the mesh collider in response to the virtual object moving out of the FOV of the camera.

12. The method as in claim 10, wherein generating the mesh collider includes:
computing, as a normal to the mesh collider in a vicinity of a vertex of the set of vertices, a cross product of orthogonal vectors formed by neighboring vertices of the set of vertices.

13. A computer program product comprising a nontransitive storage medium, the computer program product including code that, when executed by processing circuitry of a server computing device, causes the processing circuitry to perform a method, the method comprising:
generating a triangular mesh representing a physical environment and a depth map of the physical environment, the triangular mesh including a plurality of vertices, the depth map including a plurality of depth values;
performing a displacement operation on the plurality of vertices of the triangular mesh including removing a vertex of the plurality of vertices of the triangular mesh in response to the depth map satisfying a criterion to produce a plurality of displaced vertices representing a geometry of at least one real object within the physical environment;
receiving virtual object data representing a virtual object configured to be displayed with the at least one real object in the physical environment; and
displaying the virtual object in the physical environment on a display to produce a displayed virtual object, the displayed virtual object having a difference from the virtual object according to the plurality of displaced vertices.

14. The computer program product as in claim 13, wherein the criterion includes a difference being greater than a threshold, the difference being between the depth value of the depth map corresponding to the vertex and an average of the depth value of the depth map corresponding to the vertex and the depth values corresponding to a set of neighboring vertices of the plurality of vertices.

15. The computer program product as in claim 13, wherein the triangular mesh further includes a plurality of indices indicating a connectivity of the triangular mesh, each of the plurality of indices corresponding to a respective vertex of the plurality of vertices of the triangular mesh, the connectivity of the triangular mesh being constant over time.

16. The computer program product as in claim 13, wherein generating the depth map includes:
generating the depth values of the depth map along a ray emanating from a light source in a vicinity of the physical environment.

17. The computer program product as in claim 13, further comprising:
generating a mesh collider based on the triangular mesh, the mesh collider being configured to detect collisions between the at least one real object and the virtual object, the mesh collider including a set of vertices.

18. An electronic apparatus, the electronic apparatus comprising:
memory; and
controlling circuitry coupled to the memory, the controlling circuitry being configured to:
generate a triangular mesh representing a physical environment and a depth map of the physical environment, the triangular mesh including a plurality of vertices, the depth map including a plurality of depth values;
perform a displacement operation on the plurality of vertices of the triangular mesh including removing a vertex of the plurality of vertices of the triangular mesh in response to the depth map satisfying a criterion to produce a plurality of displaced vertices representing a geometry of at least one real object within the physical environment;
receive virtual object data representing a virtual object configured to be displayed with the at least one real object in the physical environment; and
display the virtual object in the physical environment on a display to produce a displayed virtual object, the displayed virtual object having a difference from the virtual object according to the plurality of displaced vertices.

19. The electronic apparatus as in claim 18, wherein the criterion includes a difference being greater than a threshold, the difference being between the depth value of the depth map corresponding to the vertex and an average of the depth value of the depth map corresponding to the vertex and the depth values corresponding to a set of neighboring vertices of the plurality of vertices.

20. The electronic apparatus as in claim 18, wherein the triangular mesh further includes a plurality of indices indicating a connectivity of the triangular mesh, each of the plurality of indices corresponding to a respective vertex of the plurality of vertices of the triangular mesh, the connectivity of the triangular mesh being constant over time.

* * * * *